United States Patent [19]

Arnesen et al.

[11] Patent Number: 4,545,887
[45] Date of Patent: Oct. 8, 1985

[54] ELECTRODE FOR ELECTROSTATIC WATER TREATMENT

[76] Inventors: Tore C. Arnesen, 23 Linden Cir.; Tore Arnesen, 25 Linden Cir., both of Georgetown, Ontario, Canada, L7G 4Y7

[21] Appl. No.: 554,070
[22] Filed: Nov. 21, 1983
[51] Int. Cl.⁴ .................. C25B 11/00; C25D 17/10
[52] U.S. Cl. .................... 204/280; 204/286; 204/290 R; 204/302
[58] Field of Search .......... 204/280, 286, 288, 290 R, 204/302

[56] References Cited

U.S. PATENT DOCUMENTS

| | | | |
|---|---|---|---|
| 2,908,623 | 10/1959 | Doring, Jr. | 204/196 |
| 3,357,910 | 12/1967 | Shiller | 204/195 |
| 3,585,122 | 6/1971 | King | 204/302 |
| 3,772,178 | 11/1973 | Wilson | 204/280 X |
| 3,941,676 | 3/1976 | Macken | 204/266 |
| 4,024,047 | 5/1977 | Clark et al. | 204/302 |
| 4,073,712 | 2/1978 | Means | 204/186 |
| 4,199,429 | 4/1980 | McMahon | 204/302 |
| 4,436,604 | 3/1984 | Walters | 204/196 |

Primary Examiner—G. L. Kaplan
Assistant Examiner—William T. Leader
Attorney, Agent, or Firm—Donald E. Hewson

[57] ABSTRACT

The disclosure is of an electrostatic electrode placed directly in a storage tank of a water system. Hitherto, the electrode has been placed in a water jacket which is connected into the pipework. Improved consistency of de-scaling performance is thereby achieved, and the cost of installation is much reduced. Also disclosed is a construction of electrode that is well suited to mounting without the protection of an enclosing jacket or pipe, the construction being based on the use of a screwed rod passing down the center of the electrode, and insulated from the mounting means.

7 Claims, 2 Drawing Figures

ELECTRODE FOR ELECTROSTATIC WATER TREATMENT

BACKGROUND OF THE INVENTION

The invention relates to electrostatic descalers for water systems.

Electrostatic descaling is to be distinguished from the process of preventing corrosion in a water system by providing a sacrificial anode. In the latter, an electrical current flows through the water, and the anode is in electrical contact with the water. The electrical voltage is only a few volts. In electrostatic descaling, the voltage is often thousands of volts, and the electrode has to be well insulated from the water: no current flows through the water since the de-scaling effect is dependent on the electrostatic field.

Hard water contains calcium and magnesium salts and compounds (particularly carbonates) that precipitate out of the water and form scale on metal surfaces, particularly hot metal surfaces. A tiny particle of suspended matter can act as a nucleus on which the precipitate readily builds up. An electrostatic field ionizes these tiny particles so that they no longer promote nucleation. Hence, the hard salts in the water tend to pass straight through the system without being deposited as scale.

If an electrostatic field is applied to an existing system that has scale, then again the field acts to break up the nucleus. The scale loses all its strength and adhesion through this action, and can be easily flushed away.

PRIOR ART

A typical manner in which an electrostatic field is applied to a water system is that shown by KING in U.S. Pat. No. 3,585,122 (June 15, 1971). It can be seen from this patent that an electrode is placed inside, and well insulated from, an outer jacket. The electrode is charged to a high voltage, the casing being grounded. The water to be treated is fed into the jacket and flows over the insulated electrode.

This arrangement is substantially a standard arrangement amongst those who are skilled experts in the art. That this is so is apparent from many prior patents, all of which show a water jacket, or casing, surrounding the electrode. The following patents confirm this:

U.S. Pat. Nos. 4,024,047 (CLARK, May 17, 1977) 4,073,712 (MEANS, Feb. 14, 1978) 4,199,429 (McMAHON, Apr. 22, 1980).

PCT Publication WO80/00226 (RABBIT, Feb. 21, 1980)

Although this list is exemplary, it is clear that it is an industry standard practice, which has not been departed from, to place the electrode inside a pipe, tube, casing or jacket. The pipe, tube, casing, or jacket containing the electrode has invariably been provided with flanged ends or such similar means for installing the jacket into the pipework layout of the system. The jacket may be fitted to the system as original equipment or it may be added later in an attempt to curve an established scale problem. The jacket may be installed at a place in the system either where all the throughflow of water flows through the jacket, or where only a by-pass flow flows through the jacket.

BRIEF DESCRIPTION OF THE INVENTION

One of the problems of electrostatic water treatment is that its effectiveness is sometimes unpredictable. Water systems that seem similar can take widely different times to de-scale, for instance. It is recognized in the invention that the performance of electrostatic treatment can be made more predictable by locating the electrode not in a pipe, tube, casing, or jacket but in a storage tank. In the invention, the vessel that houses the electrode is not a jacket but a tank. (It is, of course, essential for the establishment of an electrostatic field that there be two electrodes, not one: the other electrode is the material of the vessel, which is grounded.) Placing the electrode in a tank means that the whole of the tank is subject to the electrostatic field, though the intensity of the field diminishes in the areas of the tank that are more remote from the electrode. It has been found that water systems in which the electrode is placed in a tank rather than in a jacket have consistently been more rigorously, and more quickly, descaled.

The following explanation is offered for the improvement in the consistency of performance. When the electrode is in a jacket, the electrostatic field, though intense, only covers the water that is actually in the jacket: the field does not influence water outside the jacket. When the water is not flowing, then the water that is in the jacket at that time is very effectively treated. When the flow re-starts, that water mixes with the rest, and the effect may then be too diluted to be adequate. It would seem to follow that treatment is to some extent time-dependent so that particulate matter in water that flows past the electrode is not quite so effectively ionized as that of water which remains static near the electrode for a time. The reason for the improved consistency of performance in the invention therefore may be that the very large body of water is exposed to the field when the electrode is in the tank, even though the field cannot be locally so intense.

The following alternative explanation for the improvement in the consistency of performance is also offered. It may be that the field required to ionize the water in an effective manner needs to be quite an intense one. Only the water in the immediate proximity of the electrode therefore is effectively ionized. In a tank, there are always at least small circulatory currents present. Substantially all of the water in a tank therefore passes close by an electrode in the tank, if the water remains in the tank for any period of time. This is particularly true in a hot-water tank since then the circulatory currents are the vigorous convection currents. In a jacket, on the other hand, there are virtually no circulatory currents or eddy currents when the water is not flowing, and hence virtually none of the water goes near enough to the electrode to be ionized if it be true that only water very near the electrode is effectively ionized. When the water is flowing, its dwell-time in the proximity of the electrode is short. Sometimes, therefore, water treated in a pipe is adequately treated, sometimes treated, sometimes not, depending on the water flow demands in the system.

The reason for the improved consistency of performance in the invention thus alternatively may be that the influence of the electrode extends only over a short distance. All the water in a tank tends to circulate near a tank-mounted electrode sooner or later, but when the electrode is in a jacket it can happen that very little of the water is near the electrode for long enough to be treated.

Besides the improved consistency of performance another benefit that arises from locating the electrode in a storage tank is the ease of its installation. All that is required, for installation is the provision of a single hole in the tank. This may be compared with the difficulty with the prior art jacketed electrodes of breaking into a length of piping, whether through-flow or by-pass, preparing the ends of the piping with attachement flanges or other suitable means, fitting gaskets, making water-tight joints, providing hangars to take the weight of the jacket indeed finding room at all in a complex pipe layout where the jacket can be installed. Many of these problems are present even if the jacket is installed when the system is first built. The job of installing the jacketed electrode cannot take place when there is water in the pipe. Hence, the water pressure must be relieved (which might only be possible by draining the system) and valves fitted to the pipes. Depending on the layout, up to three valves may be necessary to cater for shutting off the water as required. The cost of such valves for water pipes of more than a few centimeters diameter can render the cost of installing a jacketed electrode in a pipe quite prohibitive.

By contrast, when the electrode is installed in a tank, as in the invention, these problems do not in substance exist. Tanks for practical water systems almost invariably include blanked-off holes, which are used to receive thermostats, heating elements, and so on. To install the electrode as in the invention, the procedure is to (a) close all water inlets and outlets of the system, then (b) open the drain cock. Some water of course flows out, until a sufficient vaccum has built up in the system to prevent further loss. If a plug in the tank is now removed, air will enter the tank to counter that vaccum. In a practical system, there is enough time upon removing the plug to insert the electrode and for the electrode to be fully screwed home into the hole, before substantially any water can leak out of the hole. Thus no valves are needed, and the system need not be drained. The savings in comparative cost and time can be huge.

Turning to another aspect of the invention, since the electrode is charged to a lethal voltage, it is important that the insulation between the conductive parts of the electrode and the water is not prone to deterioration or damage, although an electrical ground-fault current limiting device will usually be employed, set to trip at only a few milliamperes of current. On the other hand, it is important that the insulation be not so thich that much of the electrostatic charge is lost in the insulation. In the invention, it is recognized that a thin film of polytretrafluoroethane (PTFE) can be applied, relatively inexpensively, to the metal of the electrode to insulate it from the water, and that such a film is robust enough, and will last indefinitely. The manner in which the film is applied to the electrode, in the invention, will be described presently. When the electrode was in a jacket, it could be installed in the jacket under factory-controlled conditions. In the invention the electrode is in the tank, and will often have to be fitted to the tank after the tank is installed. Hence, the insulation aspects must be adjusted to the manner of assembly and use of the electrode. The insulation cannot be fragile and vulnerable to damage since, particularly in the case where the electrode is retro-fitted to an established system, the insulation may be subject to damage due to abuse leading to a very dangerous condition.

For the purposes of the invention, the difference between a pipe tube, casing, or jacket on the one hand and a tank is one of size, and to some extent shape. A vessel is large enough to be a tank if there is substantially no gross movement of the fluid as a body through the vessel at any time during normal operation of the system; a vessel is a jacket if, when fluid is flowing in the system, substantially all the fluid in the vessel moves bodily together in the direction of flow. There may be, and usually are, circulatory currents in a tank, or possibly in a jacket: but there is no tendency of the whole body of fluid to move in a tank, as there is in a jacket.

DETAILED DESCRIPTION OF PREFERRED EMBODIMENT

Figure 1:
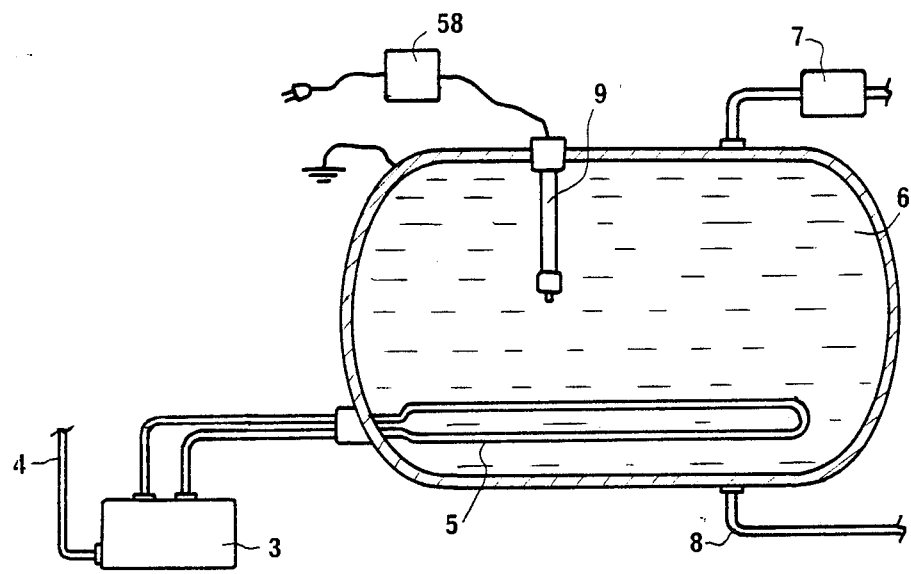
Figure 2:
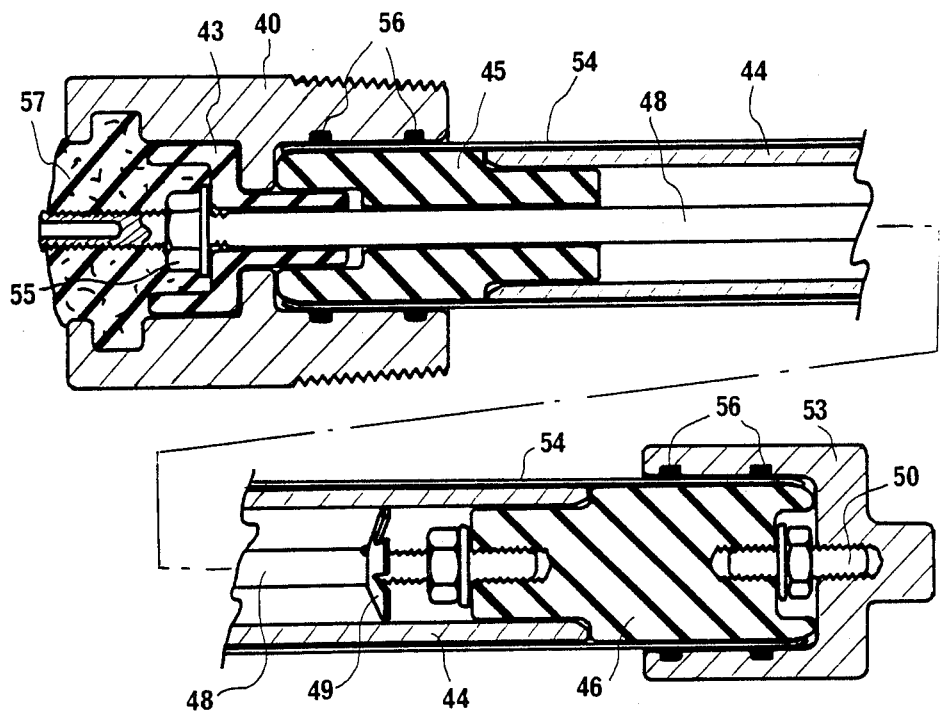

The invention will now be further described by way of example, with reference to the accompanying drawings in which:

FIG. 1—is a circuit diagram of a water system; and
FIG. 2—is a section through an electrode.

The circuit in FIG. 1 includes a boiler 3, which is fed from a supply 4. Hot water from the boiler 3 passes through the coils 5 that constitute a heat exchanger, and back to the boiler 3.

Hot water in the coils 5 heats the water in a storage tank 6. Water from the tank 6 goes to the hot water consumer 7. Cold water enters the tank 6 from a supply 8.

The system described could be part of a domestic hot water supply, where all the hot water is discharged after use, such as apartment buildings, large office buildings, hotels, etc. Or, the system could be part of an industrial plant, where at least some of the hot water is cooled and recovered after use, and recirculated through the system, such as a hot water heating plant. From the point of view of scaling, usually the worst is the all-discharged-after-use system: this is the type of system that benefits the most from electrostatic de-scaling. In the boiler part of the circuit, the water is re-used again and again, with hardly any make-up water being needed, and so scale does not tend to build up so rapidly. Even so, what scale there is could be removed by electrostatic de-scaling. Economically, however, it is usually most worth descaling the water in the consumption part of the circuit.

An electrostatic anti-scale facility is provided, which includes an electrode 9. The components of the electrode 9 include: a brass mounting boss 40, a locator 43, an aluminum tube 44, plastic tube end caps 45, a male-threaded aluminum rod 48, a star washer 49, a stud 50, a brass end boss 53, and a sleeve 54.

The function of the star washer 49 is to ensure a good electrical contact, and a firm mechanical location, between the tube 44 and the rod 48. The rod 48 with the washer 49 on it is thrust into the tube 44 hard enough to deflect the rim of the washer 49 so that it grips the inside surface of the tube 44.

The electrode includes an elongate rod comprising the aluminum tube 44 and the plastic caps 45, 46. The exterior surfaces of the tube 44 and the caps 45,46 blend smoothly together, being of a constant diameter.

The threaded rod 48 is concentric with and inside the tube 44. It fits a tapped hole in the first 46 of the plastic and caps, and passes through a plain hole in the other 45. A nut 55 enables the two caps to be tightened firmly and rigidly to the tube 44, which is important for the sake or robustness in an electrode which is shipped, handled, and installed as a standalone unit, without the protection of a jacket or casing, as was the case with prior art electrodes.

Tightening the nut 55 also clamps the mounting boss 40 to the elongate rod firmly, rigidly, and tightly. The end boss 53 is similarly clamped to the first plastic cap 46 by means of the stud 50. The stud 50 and the threaded rod 48 must, of course, be kept seaparate, so that the brass end 53 cannot be charged with the voltage in the rod 48.

A sleeve 54 of PTFE is then fitted around the outside of the tube 44 and the caps 45, 46, which are all of the same diameter. The sleeve 54 is heated so that it shrinks onto the outside of the tube 44 and caps 45, 46. This sleeve 54 is to be an important part of the insulation for the electrode, and must be of homogeneous structure and of a general high quality. Thin films of PTFE (the thickness, after heat shrinking, is about ½ mm) can be inexpensively made to a consistent high quality, free of flaws and inclusions, which makes them most suitable for this application. PTFE in moulded, thick-walled, tube form cannot usually be made economically to the quality required.

The PTFE encased core of the electrode 9, i.e., the tube 44, rod 48 and caps 45,46, is assembled into the boses 40, 53 in the manner shown. Insulative sealing is provided by O-rings 56, two at each end being provided for extra security.

Assembly of the electrode 9 is completed by the forming of a plug 57. This provides a moisture barrier to protect the high voltage parts from water vapour on the outside of the tank 6. The plug 57 is made of a cold-curing plastic that is simply poured into the space in the boss 40, and left to set.

A hole is left to provide access to the central rod 48. An electrical lead plugs into the rod 48 and conveys the high DC voltage from a DC source 58 to the electrode 9 or the lead could be permanently wired to the rod 48. The DC source 58 is powered from a standard AC supply, and, as mentioned above, a ground fault sensor and cut-out is very desirable to prevent electric shocks if the insulation should for any reason become incomplete.

Often the electrode 9 will be inserted into the tank through a threaded hole. It is important for the installer to make sure that the sleeve 54 is not damaged against the sides of the hole. To obviate this possibility, a cage, either of metal wire or of plastic, could be fitted around the sleeve 54, and located on the bosses 40,53. Alternatively, a water-soluble coating could be provided around the sleeve 54.

It is important for the sake of safety and long-life of the electrode that the insulation is very resistant to damage that might be caused by everyday accidents and abuse. The clamped-together construction is of the essence in this respect, together with the fact that the PTFE sleeve has no holes in it. PTFE is not the kind of material in which holes can be sealed (such as with gaskets and clamps) with anything like the reliability and resistance to mechanical knocks and jars that the electrode is likely to receive during shipping and handling.

It is recognized in the invention that although the prime purpose of the electrode described above is for use in a tank, its special manner of construction renders it suitable for use as a versatile "plug-in" electrode. As such the electrode described may be very conveniently fitted and mounted to any existing or new water system, with or without a tank, though, as described, its efficacy will be the more assured when it is placed in a tank.

Some water systems that are prone to scaling do not have a totally enclosed storage tank or cistern. The invention can be used however when the only tank available for locating the electrode is one that is open to the atmosphere. Almost invariably, the tank walls will be metal, i.e., conductive, and can be grounded. However, sometimes it might be convenient to provide a second electrode, well spaced from the first in the tank, to establish the electrostatic field.

The invention is applicable to many types of water system, such as directly or indirectly fired heater systems, or cooling and air-conditioning systems that include cooling towers.

What is claimed is:

1. Electrode for electrostatic treatment of water, comprising:

an elongate core, at least a portion of which is metal connectable to a source of high voltage;

an insulative sleeve formed of a thin film of plastic, which surrounds and encases the exterior surface of the core;

respective end bosses, insulated from the core, one at each end of the core; wherein each boss includes a groove which encircles the plastic film;

an elastomeric seal located in the groove, and so dimensioned as to be squeezed radially onto the outer surface of the plastic film;

fastener means, by which the bosses are attached to the ends of the core;

wherein the fastener means includes a clamping means for exerting a clamping force directed axially with respect to the core for clamping the bosses firmly, rigidly and tightly to the core;

wherein the electrode is self-contained as to its structural integrity, in that neither the said clamping force nor the reaction to the said clamping force is taken by or transmitted through a surrounding tank, or jacket, pipe, casing, conduit, tube, or vessel of any kind;

and one of the end bosses includes a mounting means by which the electrode may be mounted to, and sealed with respect to, a hole in plate or sheet material comprising a wall of a vessel.

2. Electrode of claim 1, wherein the metal of the core is tubular and wherein the clamping means is a screw threaded fastener means comprising a male—threaded metal rod which is located substantially concentrically inside the tubular metal of the core, and wherein the metal of the core and the threaded rod are in electrical contact, and both are insulated from both bosses.

3. Electrode of claim 2, wherein the said elongated core includes respective end caps of insulating material one at each end of the core, wherein the exterior surface of the metal of the core blends smoothly with the exterior surfaces of the caps, and wherein the sleeve surrounds and encases also at least a portion, contiguous with the metal of the core, of the exterior surfaces of the caps.

4. Electrode of claim 3, wherein the threaded rod is screwed directly into a respective complementarily tapped hole in a first one of the caps, and passes through a plain hole in the other of the caps, and wherein the screw threaded fastener means is effective to clamp both of the plastic caps firmly, rigidly, and tightly to the metal of the core.

5. Electrode of claim 4, wherein an end one of the bosses which is at the same end of the elongate core as the first cap, is secured to the first cap by a stud which is screwed directly into a respective complementarily tapped hole in the first cap, the respective tapped holes in the first cap being arranged so that the threaded rod and the stud are at all times insulated from each other.

6. Electrode of claim 5, wherein the boss that includes the mounting means has a cavity into which a plug of insulative sealant is first poured and then caused to set, leaving an end of the threaded rod exposed for direct attachment to an electrical connection to the said source of high voltage.

7. Electrode of claim 2, wherein the rod is mechanically supported with respect to the core by, and is electrically connected to the core by means of, a star washer fitted to the rod and dimensioned so that the washer is insertable into the core, and grips the core upon insertion.

* * * * *